(12) United States Patent
Orava et al.

(10) Patent No.: US 7,283,524 B2
(45) Date of Patent: Oct. 16, 2007

(54) METHOD OF SENDING A PACKET THROUGH A NODE

(75) Inventors: Fredrik Orava, Sigtuna (SE); Lars Ramfelt, Palo Alto, CA (US)

(73) Assignee: Metro Packet Systems Inc.

( * ) Notice: Subject to any disclaimer, the term of this patent is extended or adjusted under 35 U.S.C. 154(b) by 877 days.

(21) Appl. No.: 10/707,916

(22) Filed: Jan. 23, 2004

(65) Prior Publication Data

US 2005/0163100 A1 Jul. 28, 2005

(51) Int. Cl.
*H04L 12/28* (2006.01)
(52) U.S. Cl. ..................................... 370/389
(58) Field of Classification Search ................ 370/389, 370/392, 393
See application file for complete search history.

(56) References Cited

U.S. PATENT DOCUMENTS 6,041,053 A * 3/2000 Douceur et al. ............ 370/389
6,259,699 B1 * 7/2001 Opalka et al. ............. 370/398
2004/0131064 A1 * 7/2004 Burwell et al. ............ 370/397

* cited by examiner

*Primary Examiner*—Hassan Kizou
*Assistant Examiner*—Anthony Sol
(74) *Attorney, Agent, or Firm*—Rolf Fasth; Fasth Law Offices (57) ABSTRACT

The method is for sending information through a node and includes providing a node that has a first access port, a second access port, a first uplink and a second uplink. A first packet is sent via the first access port to the node. When the node is in a leaf mode, the node creates a tag inside the first packet. The tag contains a first port number corresponding to the first access port. When the node is in a branch node, the node adds the first port number to the tag and sends the packet in the first uplink and the second uplink. A second packet, received via the second access port, is sent via the first uplink of the node. The node receives the second packet. The node removes a second port number that corresponds to the second access port from the tag. The node sends the second packet via the second access port to another node or customer lower down in the node tree.

19 Claims, 4 Drawing Sheets

| Address | Description |
|---|---|
| 0x0 | This level not addressed |
| 0x1-0xA | Address for ports 1-10 |
| 0xB-0xD | Reserved |
| 0xE | Address for AUX port |
| 0xF | Address for ring topology detection |
| Untagged | Address for OAM in unit |

Fig. 7

| Nibble | Valid values |
|---|---|
| Nibble 3 | 0x0-0xA, non zero only if Nibble 2 is non zero |
| Nibble 2 | 0x0-0xA |
| Nibble 1 | 0x1-0xA, 0xE, 0xF |

Fig. 8

| Address | First nibble | Second nibble |
|---------|--------------|---------------|
| 0x0 | This level not addressed | This level not addressed |
| 0x1-0xA | Ring node 1-10 | Port 1-10 |
| 0xB-0xC | Ring node 11-12 | Reserved |
| 0xD | Reserved | Reserved |
| 0xE | Reserved | Address for AUX port |
| 0xF | Reserved | Address for topology detection |
| Untagged | Reserved | Address for OAM in unit |

| Nibble | Valid values |
|--------|--------------|
| Nibble 3 | 0x0-0xC, non zero only if Nibble 2 is non zero, 0xB or 0xC only if this field is ring node number |
| Nibble 2 | 0x0-0xC, 0xB or 0xC only if this field is ring node number |
| Nibble 1 | 0x1-0xA, 0xE, 0xF |

METHOD OF SENDING A PACKET THROUGH A NODE

BACKGROUND OF INVENTION

The method of the present invention relates to sending a packet through a node including both ingress and egress traffic.

SUMMARY OF INVENTION

Metro networks are often organized in two levels including metro access and metro core systems. Metro access networks are deployed near the end customer while metro core networks aggregate several access networks deployed in different parts of the metro area. The metro core systems also host the gateway(s) to the wide area backbone network. Currently the dominating technology to connect individual customers and businesses to the Internet is a leased 1.5 or 2.0 Mbps TDM circuits from the customer premises to the provider edge node, that is, a router or a switch, located in the point-of-presence (POP). The edge equipment is populated with channelized TDM interface cards. This TDM circuit, with limited and relatively expensive capacity, is a bottleneck. The access circuit is provisioned separately from the provisioning of the network service (for example an IP service), leading to high operational overhead. When several circuits are aggregated in the TDM access network, statistical sharing of capacity is not possible due to the fixed nature of TDM circuits. Statistical multiplexing of the traffic can occur only first after the traffic reaches the packet based edge equipment. The channelized TDM interfaces include complex hardware that monitors each circuit individually but makes line cards expensive.

The capacity bottleneck of the TDM system may be avoided by migrating to a high-capacity packet-based access infrastructure, such as Ethernet. Ethernet equipment is low cost, high capacity, and widely deployed in the industry. Ethernet switches forwards packets based on the destination address. Ethernet switches are intended for friendly enterprise environments and include a number of automatic features in order to easy the installation and operation of the network. However, these automatic features become problematic in large scale operator environments. The automatic features do not scale to large infrastructures and needs sometimes to be disengaged to increase security. This requires manual configuration of possibly a large number of individual units. One specific example of an automatic feature of an Ethernet switch is that they dynamically learn each unique source address of the packets received in order to optimize the forwarding of traffic. It is sometimes necessary to disengage this learning process to prevent customers from being able to communicate directly with each other without going through a service provider.

In summary, problems with basic Ethernet switches include: no support for customer separation; low degree of security due to the fact that cross traffic directly between end-customers is allowed; dynamic address learning may open up for DoS attacks; requires distributed element management and service creation due to the fact that a potential large set of distributed units needs to be configured and managed; and the standard based Spanning Tree Protocol (STP) based restoration is slow.

The method of the present invention provides a solution to the above-outlined problems. More particularly, the method is for sending information through a node and the method includes providing a node that has a first access port, a second access port, a first uplink and a second uplink. A first packet may be sent via the first access port to the node in an ingress direction. When the node is in a leaf mode, the node creates a tag inside the first packet. The tag contains a first port number that corresponds to the first access port. When the node is in a branch node and a tag already exists, the node may add the first port number to the tag. The node then forwards the packet to another node higher in the node tree or to a router. A second packet, containing a tag addressing the second access port, may be received via the first uplink to the node in an egress direction that is opposite the ingress direction. The node receives the second packet. The node removes a second port number that corresponds to the second access port from the tag. The node sends the second packet via the second access port to another node or customer lower down in the node tree.

DETAILED DESCRIPTION

In general, the method of the present invention includes the steps of adding a tag and port numbers when the packet moves upwardly in a tree topology towards edge equipment such as a router or switch, i.e. in an ingress direction, so that each node shifts previous port numbers and adds a port number before forwarding the node. When the packet moves from a router downwardly in the tree topology, i.e. in an egress direction, each node removes the port number of the outgoing access port from the tag and shifts the subsequent port numbers within the tag.

Figure 1:
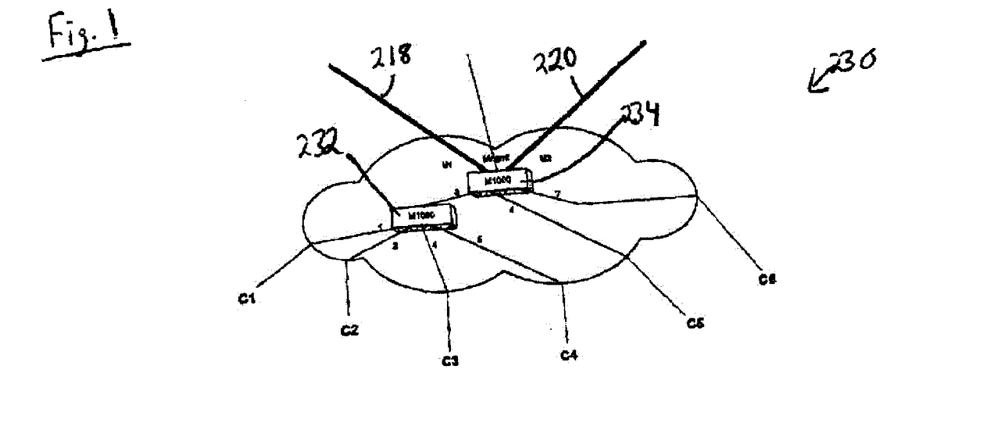
FIG. 1 is a schematic illustration of node units in an access network.

With reference to FIG. 1, the physical topology 230 may include Marvin node units 232, 234. A tree structure may be used to aggregate the customer traffic in several steps towards a hub node. A daisy-chain of Marvin multiplex units 232, 234 can be used to simplify the build out when a tree is unsuitable or to reduce the amount of fiber or copper links as well as the number of router or switch interfaces. The units 232, 234 can be used to connect and merge a plurality of customer lines while keeping each customer's traffic separate with tags so the traffic streams are not mixed up. For example, each unit may have ten customer ports and two uplinks. The units 232, 234 may have the characteristics of receiving and sending Ethernet frames and the units only switch information between the network ports and the access ports and vice versa but not between different access ports. The tags may be used to distinguish the traffic from and to the customers so that a virtual interface in the provider edge equipment may be set up for each customer. Preferably, the tags are of a type that is currently used by many provider edge equipments to make the implementation easy. As explained in detail below, when untagged traffic is coming from a customer the Marvin node units add the tags before the traffic is sent to other nodes or to the router. Similarly, when traffic going from the provider edge equipment to the customer, tag segments are removed and shifted as the packet moves towards the customer. The provider edge equipment may in turn be connected to an IP network, or any other suitable network.

Many different access network service architectures may be used. The architectures may be based of the number of redundant connections to the metro core network and to the customer site. Single and dual connections provide four possible combinations including a single network that has a single customer connected thereto. In a single-network-single-customer architecture, the access network is attached to the metro core via one connection and the customer is connected to the access subsystem via one connection. All traffic transmitted from the network core via the access system is delivered without duplication to the customer and vice versa. All redundancy and restoration mechanisms are hidden within the access subsystem. It is impossible in this architecture to protect the attachment links or attachment nodes.

Another situation is a dual network with a single customer attached thereto. The access network is attached to the metro core via two independent connections and the customer is connected to the access subsystem via one connection. In this way, two provider edge nodes may be connected to the access network so that one provider edge node may be the back-up for the other in case the first one malfunctions. All traffic transmitted from the network core via any of the two metro core attachment links are forwarded to the customer. Traffic from the customer is forwarded to both of the two metro core access links if the provider edge equipment is capable of filtering the information in order to avoid duplication (i.e. IP routers). In other environments (switched Ethernet) ingress traffic is only sent via one of the two metro core access links. This additional filtering is provided by the Marlin node attaching to the metro core.

It is possible in this architecture to protect the attachment links or attachment nodes, but it requires additional functionality in the metro core system or in the customer system. The requirements may be fulfilled by specific redundancy mechanisms such as VRRP, HSRP or generic dynamic routing protocols such as OSPF. VRRP and HSRP only effects the metro core system, OSPF requires also the customer to participate in the protection procedure.

Another classification is a single-network with a dual-customer attached thereto. The access network is attached to the metro core via one connection and the customer is connected to the access subsystem via dual connections. All traffic transmitted from the network core via the access system is delivered without duplication to either of the customer connections. Two modes of this system are possible. Either the customer delivers one copy of each frame to both of the attachment connection or the customer delivers a single copy to one of the attachment connections. In both cases the access network guarantees to deliver the traffic without duplication. If the customer choose to send traffic to only one of the access links it requires the customer to interact either with the access system itself or the metro core system to accomplish restoration in case of failures.

The last classification includes a dual-network with a dual-customer attached thereto. The access network is attached to the metro core via dual connections and the customer is also connected to the access subsystem via dual connections.

A basic requirement for all types of restoration mechanisms is the presence of redundant resources. One common model is to use one specific resource as primary and protect it by a back-up, or stand-by resource, of the same type. One resource can be the back-up for a number of primary resources. The types of resources that can be duplicated in access systems built with Marlin units are communication links and Marlin nodes. The communication link includes optical as well as electrical ones. To provide a high degree of redundancy, the duplicated links should be located in different cables in order to achieve physically different communication paths. Nodes, such as Marlin units, can be duplicated in order to protect against nodes failures and to provide a mechanism to perform up-grades and maintenance on these without disturbing the service delivery.

The node unit of the present invention implements a multiplexing stage to be used in access networks connecting to routers and switches. The small size and low per port and per unit cost allows the unit to be located very close to customers or inside the customer premises.

All multiplexing, de-multiplexing in the system of the present invention may be based on standard 802.1q tagged Ethernet frames. Future products may utilize other schemes such as MPLS or IP tunneling. The general mechanisms are however the same allowing different implementation options when needed. With three levels, or less, of multiplexing a single VLAN tag may contain the full path (i.e. source route) information, only placing a requirement of being able to handle a single tag on the router or switch. The logical topology of the access system is preferably hub-and-spoke, but the physical topologies can be daisy-chains, rings and trees possibly with multiple redundant nodes distributed within the physical topology.

Preferably, the supported link mode is full duplex only for the TX links (FX links are always full duplex). This allows for simpler management of the access network independent of link types. The usage of only full duplex links also helps maintaining QoS and simplifies configuration and error localization in Marlin node networks.

Each node unit may have ten access ports so that each access port may be used to connect a customer or another Marlin node unit. Of course, the node units may have more or fewer access ports. All ingress data arriving on the access port are tagged with the corresponding port number and then forwarded to the network port(s). Access ports are isolated from each other and direct communication, without passing the root node, between two access ports is not possible. This increases security and prevents unwanted cross-traffic.

Preferably, there are two uplink network ports in each node unit. The network ports are used to connect to a switch, a router or another Marlin unit. Packets arriving on the network port are assumed to be tagged with the outgoing access port number that the packet is destined for. As outlined in detail below, the frames are sent out on the access port and the port routing information in the tag is removed. If the remaining tag is 0, indicating that the last hop in Marlin network has been reached, the complete tag is removed, as explained in detail below.

The node unit may be managed via any of the network ports or a dedicated management port such as the AUX port.

One purpose of the AUX port is to allow a management station to be attached to the Marlin node unit when both of the network ports are used as uplinks. The AUX port is a 10/100 Ethernet port only used to connect an external computer, running a Marlin software with a remote CLI process or other management software, to the unit for local debugging in the field or to directly connect a Marlin unit controller (MUC).

The Marlin node units, such as the M1000 products, may use optical fiber interfaces for some of the ports. SFP cages are used and may be populated with SFP modules with different ranges and modes. The network ports are made of copper and fiber, one RJ45 copper connector and one SFP fiber module per port. Preferably, only one of them is active at a time. The access ports are copper for M1000T and fiber for M1000F.

Preferably, the M1000F has ten 100 Mbps fiber optical access interface ports, two dual network ports and one AUX port. Each access port is a small form factor with a pluggable optical transceiver (SFP) socket that accepts modules. Each of the two network ports of the M1000 is both copper 10/100/1000 Mbps and fiber 100/1000 Mbps Ethernet ports. The network SFP cages can be populated with 100 Mbps or 1000 Mbps SFP modules. When both fiber and copper interfaces are connected the selected default interface is active while the other interface is disabled.

Two redundant fans are located on the right side of the unit. Each of the fans provides enough airflow for cooling. The fans are not accessible from the outside of the unit. The fan status can be monitored by the management system and if a fan fails an event notification message may be generated.

The Optional Management Card (OMC) is an internal CPU card that provides additional services to the base M1000 system. The OMC card runs a custom network operation system with SNMP agent(s), a command line interface (CLI) and other management processes.

To simplify management of a Marlin system, and minimize the possibility of configuration errors, automatic topology detection and configuration is available. One purpose of the automatic topology detection is to allow an operator or a management station to execute an automatic topology detection protocol and gather the complete physical topology map without prior configured knowledge about the topology.

The basic mechanism used to collect information about node status and topology is the soon to be standard EFM OAM Information PDUs (IEEE802.3ah Ethernet in the first mile (EFM)).

Preferably, a Marlin unit will always terminate untagged OAM Information PDUs received via the network ports and reply with a vendor specific extended EFM OAM Information PDU. With this mechanism the node closest to the management station can be probed and configured. With the closest unit configured and configured to a known state it is possible to probe further in the network topology.

Probing down a tree topology may be done top-down. When the first unit is probed and configured the units connected to the access ports can be probed and then configured. For example, probing of the unit connected to port 3 of the top unit is done with Ethernet frames containing a tag with value 0x003. The first unit removes the tag before sending the probe to port 3 untagged. By probing all access ports (with active link) in the tree hierarchy all units can be detected and configured.

Probing for ring topologies may mean that probe messages are sent out on network ports (U1 or U2) to investigate if the network port of another Marlin is connected. To generate an untagged probe to be sent out on a network port of a specific node located somewhere in the infrastructure, the probe is tagged in such a way that it arrives to the node with a tag 0x0E. If the probe tagged with 0x0E arrives on U1, the untagged probe is forwarded on U2. When the untagged probe response later arrives from U2 it is tagged with 0x0E and forwarded via U1. Tree probing requires two mechanisms to be present in a node. Firstly, probe messages tagged with 0x0E and arriving via one network port are transmitted untagged via the other network port. Secondly, untagged probe reply messages arriving via one network port are tagged with 0x0E and transmitted via the other network port.

Probe messages are implemented as standard EFM OAM Information PDUs. Probe reply messages are implemented as vendor specific extended EFM OAM Information PDUs. In the case a Marlin unit controller is present at the AUX port or an OMC port it will be responsible for all probing and the messages will always pass through the unit controller. There are two cases how ring probing is done depending on the mode the known unit is configured to. Firstly, if a Marlin unit is in tree mode and it receives an OAM packet addressed to 0x00E from a network port, it will remove the tag and send it out on the other network port for probing. If another unit is daisy chain connected to this port it will process the probe and reply back untagged. The first unit recognizes that it is a probe reply and tag the frame with port-id 0x00E and the forward it the other network port. Secondly, if a node is in ring mode and it receives a packet addressed 0x0rE, wherein r=ring node number for the unit, from a network port, it will remove the tag and send it out on the opposite network port. If another unit is daisy chain connected to this port it will process the probe and reply with an untagged. The first unit recognizes that it is an OAM probe reply and tags the frame with port-id 0x0rE and forwards it to the other network port. In this way, it is possible to probe and configure the units that are connected in daisy chain in the same way as for tree topologies.

Figure 2:
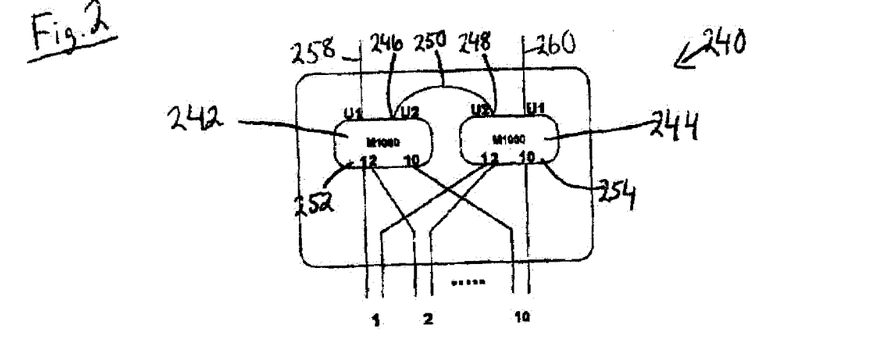
FIG. 2 is a schematic illustration of two node units connected in a tandem mode.

FIG. 2 shows two Marlin units 242, 244 of a system 240 that may be connected in tandem to provide redundancy. Of course, the Marlin units 242, 244 do not have to be connected in tandem. When connected in tandem the U2 network ports 246, 248 of the two Marlin units or nodes 242, 244 are connected together via a U2 link 250 and the access ports 252, 254 are grouped in pairs such that access ports (i), wherein (i)=252/254(1); 252/254(2);::; 252/254(10)), of the two units 242, 244 belong to the same group. The Marlin unit 242 may have a U1 link 258 and the Marlin unit 244 may have a U1 link 260. The index of the port group may be the same as the index of the ports. The behavior of the tandem nodes 242, 244 on a per port basis is described below. Ingress traffic from a customer C is forwarded to both the U1 and U2 links to provide redundancy. If the tandem node is connected to an IP network via one or several IP routers, the routers will ensure that the same message is not sent twice to the IP network. If the tandem node is connected to a switched Ethernet via one or several Ethernet switches, it is the responsibility of the tandem node to assure that no duplicated messages are sent into the attachment switches.

The egress traffic of the tandem node 242 may, for example, be received via the network port links U1 of the tandem node 242, i.e. the U1 network port of one of the constituent Marlin nodes, and is forwarded to one of the access ports of a port group determined by the tag of the received traffic. If traffic is simultaneously received via the other network port of the tandem node, that is, the port U1 of the other constituent Marlin node and is tagged with the same value, that traffic is forwarded to one of the access ports in the same port group, so it does not matter if the tagged traffic comes via one or the other network ports of the tandem node. The routing of traffic within the tandem nodes 242, 244 depends on the tag in same manner as in an individual Marlin node so that frames tagged with 0×XX3 is forwarded to one of the ports in port group 3.

The ingress traffic received via one of the access ports 252, 254 in a port group is forwarded to both of the network ports U1 of the tandem nodes 242, 244. The ingress traffic received via the other port in the group is preferably dropped.

Thus, the behavior of a tandem mode may be the same as the behavior of a normal Marlin node if the port groups are considered as abstract ports so that the identity of the individual ports within a port group is disregarded.

Figure 3:
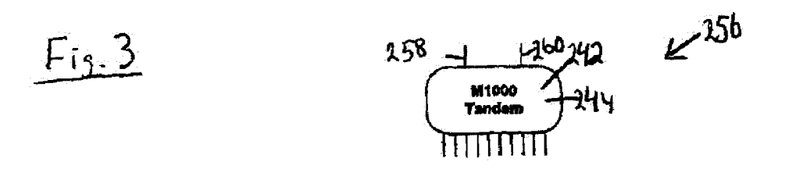
FIG. 3 is a schematic illustration of a tandem node abstraction.

As best shown in FIG. 3, internally the tandem node 256 may consist of two Marlin units 242, 244 with connected U2 ports and two U1 ports 258, 260. Port group (i) of the tandem node 256 may consist of access port (i) of the two constituent units 242, 244. Each of the two Marlin units 242, 244 operates in a tandem mode. When in the tandem mode, a Marlin unit can be in one of two tandem states on a per access port basis, including active and stand-by states. The state of the Marlin unit relative to a first access port may be active while the Marlin unit may be in a stand-by state relative to a second access port. In other words, the state of the Marlin units is in relation to the access ports. When the Marlin unit is in the active state, relative to the access port (p), the Marlin unit operates exactly in the same manner as an ordinary Marlin unit i.e. it forwards data tagged with 0xp, received from any of its network ports to port (p) and forwards all ingress traffic received via access port (p) to both of its network ports 258, 260. When in the stand-by state, relative to the access port (p), the Marlin unit by-passes all traffic tagged with 0xp, received via U1 ports 258 or 260 unmodified to U2 for egress traffic and vice versa for ingress traffic. Furthermore, ingress traffic received via access port (p) is dropped.

A Marlin unit operating in tandem mode may also operate on a per access port and tag basis. In this case the state relative a first access port and a first tag (p,t) may be active while the state of the Marlin unit may be stand-by relative a second access port and a second tag (p",t") where either p=p" or t=t" may hold. When the Marlin unit is in the active state, relative to the access port (p) and the tag (t), the Marlin unit operates exactly in the same manner as an ordinary Marlin unit i.e. it forwards data tagged with 0xpt, received from any of its network ports to port p and modifies the tag to read 0xt, and forwards all ingress traffic received via access port p tagged with 0xt to both of its network ports 258, 260 and modifies the tag to read 0xpt. When in the stand-by state, relative to the access port (p) and tag (t), the Marlin unit by-passes all traffic tagged with 0xpt received via U1 ports 258 or 260 unmodified to U2 for egress traffic and vice versa for ingress traffic. Furthermore, ingress traffic received via access port (p) tagged with 0xt is dropped.

In this way, the tandem node provides a high degree of redundancy because the network ports are duplicated, as is the case in any Marlin unit, the node itself is duplicated, and the access ports are duplicated. A protected access network may constructed by connecting units (U) with dual network ports to the tandem nodes such that both network ports of the unit (U) are connected to the two ports of the same port group of the tandem node. Any system can be connected to the access side of a tandem node and be protected as long as it accepts data from both network ports and transmits all data received from the access ports to both network ports. Two systems that may support the concept without modification are the Marlin units themselves and the ADVA units such as FSP150CP units. It should be noted that a complete subtree built from Marlin or tandem units can be connected to a port group. It should also be noted that an unprotected chain built from Marlin units fulfills the above requirements and can thus be connected to a port group.

Figure 4:
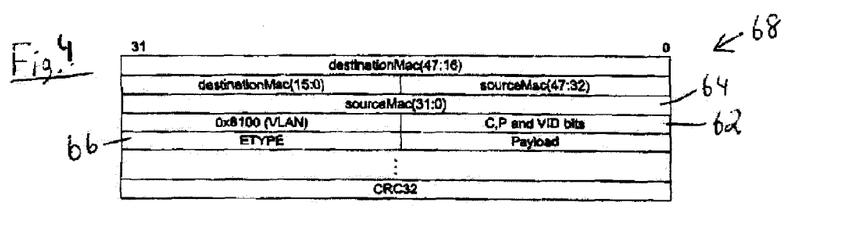
FIG. 4 is a schematic illustration of a frame with a shim header.

With reference to FIG. 4, it is possible to insert a header 62, such as a shim header, between a source address 64 and an Ethernet type ETYPE 66 of a typical frame format 68 such as IEEE 802.3.

Figure 5:
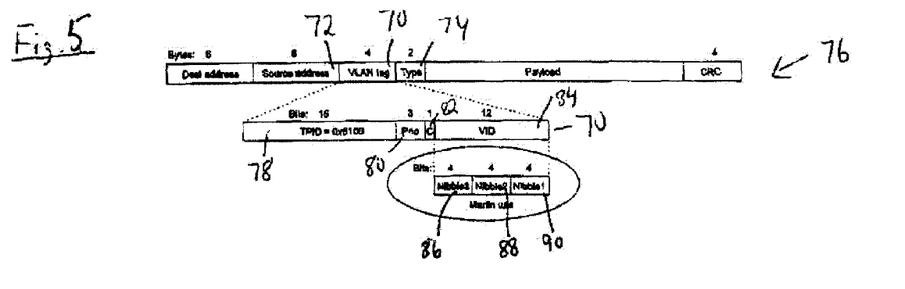
FIG. 5 is a schematic illustration of VLAN packet with nibbles.

As shown in FIG. 5, the Marlin unit of the present system may use a 32 bit shim header or tag 70 based on the IEEE802.1q format that is positioned immediately after a source address 72 of an IEEE802.3 Ethernet packet 76.

The tag 70 may include a TPID type 78, priority field 80, CFI field 82 and a VID field 84. The 12 bit VLAN ID field (VID) 84 may be divided into three independent 4-bit fields such as a nibble 86, nibble 88 and nibble 90 used for storing the source routing information. This results in up to three multiplexor levels per 802.1q header. More levels may be used but requires the router to process multiple 802.1q headers to map a customer port to a virtual interface (i.e. QinQ). The Marlin unit uses the VID (VLAN Id) field 84 of the tag for addressing and forwarding of packets through the unit. Preferably, the TPID section 78 is always set to 0x8100. The priority field 80 may be used for prioritization of packets. The CFI field 82 is usually not used by the Marlin unit and is preferably always set to zero.

As indicated above, the 12-bit VID field 84 may divided into the nibbles 86, 88, and 90 where each nibble is used for addressing in one level in a Marlin tree topology. When addressing in a tree topology, the first non-zero nibble (starting with nibble 86) indicates the address for the first unit the packet arrives to. The next nibble, such as nibbles 88, 90 if any, indicates the address for the next unit down or up in the tree hierarchy of nodes.

Figure 6:
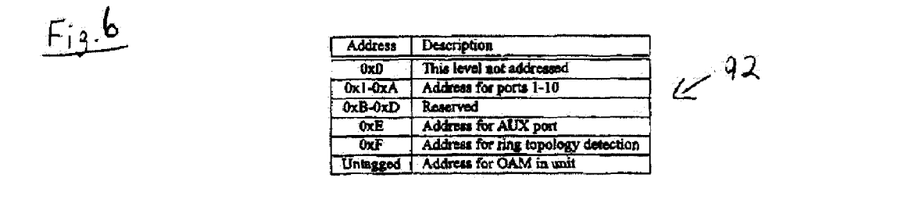
FIG. 6 is a schematic illustration of tree mode addressing.
Figure 7:
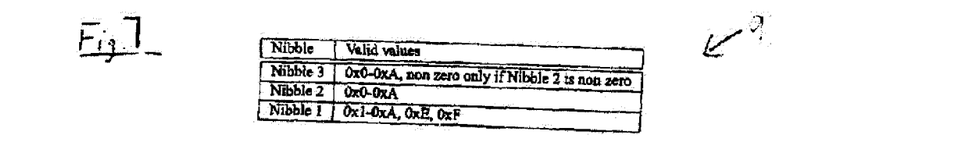
FIG. 7 is a schematic illustration of rules of tree mode addressing.

FIG. 6 shows an example 92 of how the tag addressing may be done in a tree topology. FIG. 7 defines rules 93 for valid addressing when the unit is in the tree mode or point-to-point mode.

Figure 8:
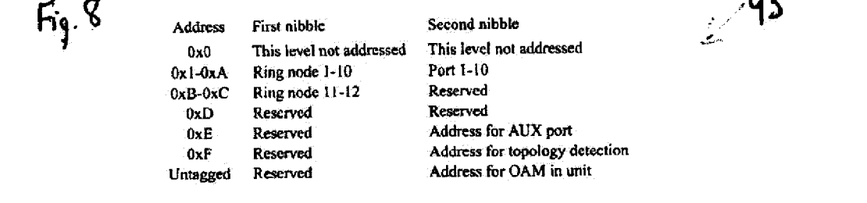
FIG. 8 is a schematic illustration of ring mode addressing.

As shown in FIG. 8, ring/daisy-chain addressing 95 has two nibbles of the VLAN tag that are used for one level of the ring. The first nibble is used for ring-node number addressing. The second nibble is used for address port in the ring-node. This leaves one nibble that can be used for addressing in one additional tree level. When addressing in a ring the first non-zero nibble, starting with nibble 90, indicates ring-node number and the following nibble indicates the port address.

Figure 9:
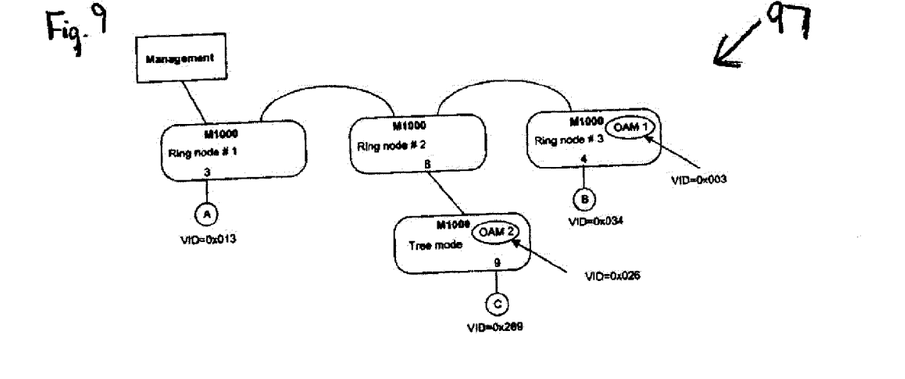
FIG. 9 is a schematic illustration of ring mode addressing.
Figure 10:
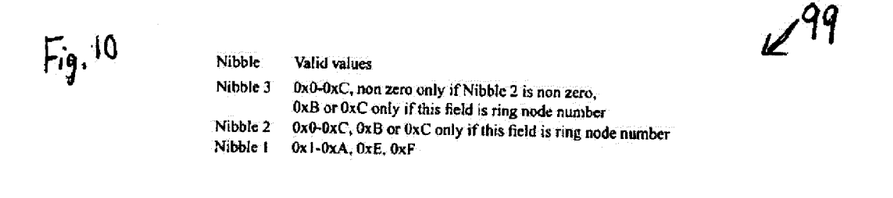
FIG. 10 is a schematic illustration of rule of ring mode addressing.

FIG. 9 shows how addressing in a ring topology 97 may be done and FIG. 10 defines rules 99 for valid addressing when the unit is in ring-mode. Port 0xE is used for ring topology detection and is described in the topology detection paragraph.

Each access port, such as ports 58, 60, may be in branch or leaf mode to indicate if the port is connected to another marlin node unit or to a customer. When the node is in the branch mode and a tag is present the tag is modified with the arriving port number. When the node is in the branch mode and no tag is present, a new tag is added in the same manner as if the node where in leaf mode as described below. When the node is in the leaf mode, which may be the default mode, a new tag is always added to the arriving frames. A new 802.1q shim header is added to packets that arrive on the port independently of the packet content. The 12-bit tag is set to the branch mode hex (00X) where (X) corresponds to the port number 1 . . . A. When the node is in the branch mode, the uplink of another marlin unit is attached to this port. Arriving ingress packets that already contain a marlin specific 802.1q shim header are modified to include both the port information from the previous unit(s) and the port info from this unit. The 12-bit tag is therefore set to hex (0YZ) where (Y) corresponds to added port number.

Figure 11:
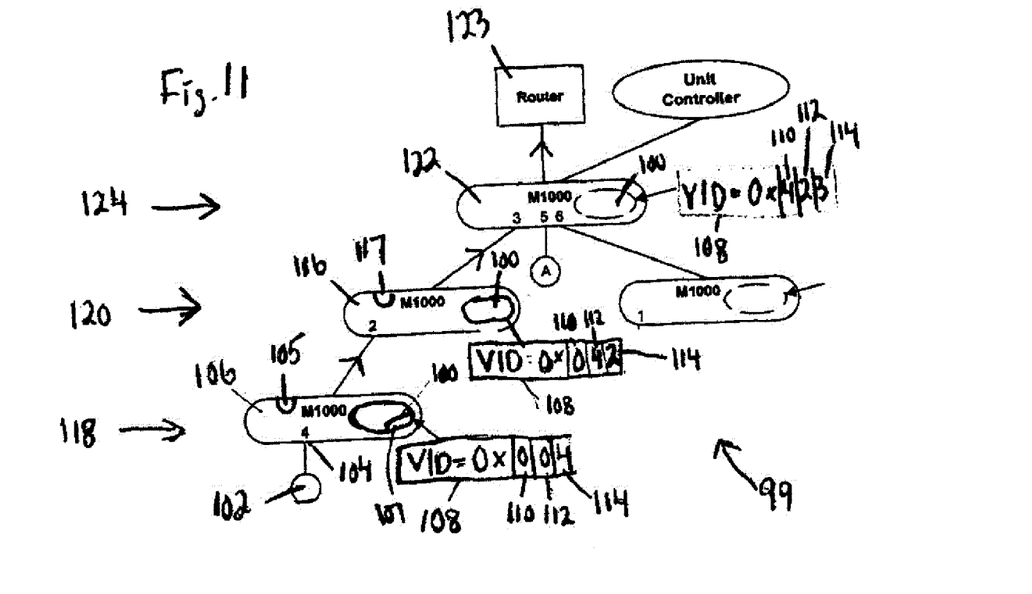
FIG. 11 is a schematic illustration of port number shifting in ingress traffic.

With reference to FIG. 11, when a packet arrives on an access port that is set in the leaf mode a VLAN tag 108 is added to the packet. The node adds the port number to the VID field 108 of the tag so that a packet arriving to port 4 will have the VID field set to 0x004. Packets containing VLAN tags and arriving to access ports when the node is in the branch mode will have their tag modified. The port number at which the packet arrives on is added to the tag on the first empty or zero nibble in the tag, starting with, for example, the rightmost nibble. In this way, an ingress packet with tag VID 0x004 arriving on port 2 will be forwarded to the network port with tag VID 0x042. Packets without VLAN tags arriving to access ports when the node is in the branch mode are treated in the same way as packets arriving to access ports when the node in the leaf mode. Access ports can be set to U1/U2/both mode. If an access port is set to U1, packets from this port will only be forwarded to network uplink ports U1. If an access port is set to U2, packets from this port will only be forwarded to network uplink ports U2. If an access port is set to both, packets from this port will be forwarded to both network ports U1 and U2. Preferably, OAM replies are always sent back via the same port as the request arrived via, regardless of the U1/U2/both setting.

For example, a packet 100 may arrive from a customer 102 to an access port 104 of a node 106 that is in a leaf mode 105 which means the node is located at the lowest level of a node tree 99. If the node 106 is in the branch mode, it is presumed that the packet already has a tag and that a previous node in the leaf mode lower down in the tree has already added the tag with the VID field. Since the node 106 is in the leaf mode, the node 106 adds an empty tag 107 to the packet 100 with the VID field 108 and the nibble furthest to the right is filled in with the port number at which the packet 100 arrived. For example, the VID field 108 of the packet 100 may have nibbles 110, 112, 114. If the packet 100 arrives on port 4, the nibble 114 will be set to 4 so that the VID field 108 may read 0x004 before it is sent further up in the node tree 99. When the node 106 forwards the packet to a node 116 that is in a branch mode 117, the information in the VID field 108 is shifted one step to the left. If the packet 100 arrives on network port 2 of the node 116, the nibble 112 is modified to include the number 4, to illustrate the port number on a first node level 118 and the nibble 114 will modified to include the number 2 to illustrate the port number on a second node level 120 so that the VID field 108 reads 0x042. In this way, the port number of the nibble 114 is shifted to the nibble 112 while the nibble 114 receives the new port number of the node at the higher level of the tree topology 99.

When the node 116 forwards the packet to a node 122, the information in the VID field 018 is again shifted one step to the left. If the packet 100 arrives on access port 3 of the node 122, the nibble 110 will be modified to include the number 4, the nibble 112 will be modified to include the number 2 and the nibble 114 will be modified to include the number 3 to illustrate the port number on a third node level 124 so that the VID field 108 reads 0x423. The node 122 then sends the packet 100 to a router or a switch 123 that may send the information to the desired address of a network core system.

If the router or switch 123 notices that the VID field 108 is not configured correctly, the router 123 may be set to drop the packet.

Figure 12:
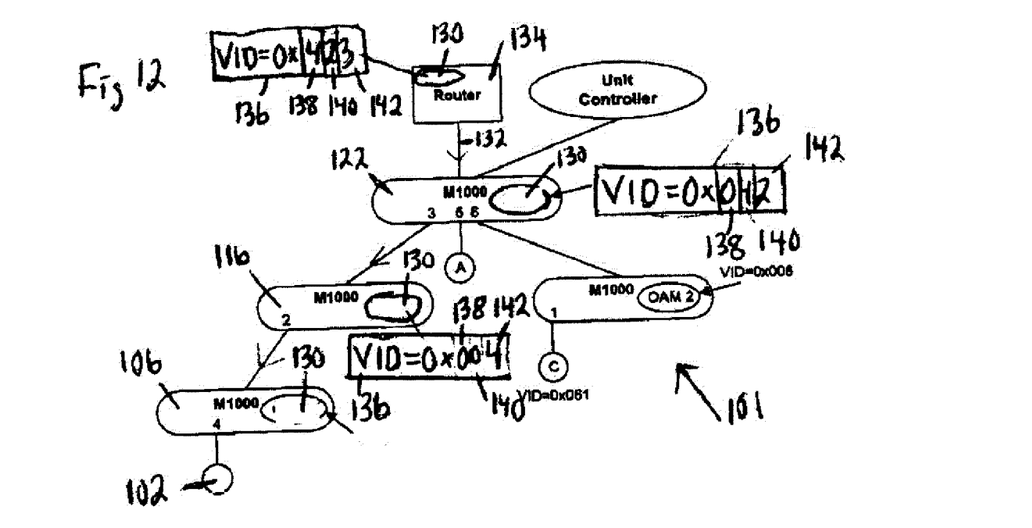
FIG. 12 is a schematic illustration of port number removal in egress traffic.

With reference to FIG. 12, when a tagged packet arrives on a network port, i.e. an egress arrival, its destination is defined by the first non-zero nibble in the VID field of the VLAN tag. It should be noted that the VID field does not include an address of the final customer, only the port number of the leaf node to which the customer is connected. If the first non-zero nibble is 0x1-0xA, the packet is forwarded to the queue for the corresponding port. The tag is also modified so that the first non-zero nibble is set to 0. If only the last nibble is non-zero the VLAN tag is removed since the packet has reached its final destination through the tree topology. Untagged EFM OAM frames may be forwarded to the OAM function of the unit.

For example, a packet 130 may arrive on a link 132 to the node 122 from a router 134. Before sending the packet into the node tree 101, the router 134 adds the tag and the correct VID field information, according to a router table, and the path through the node tree 101. Either the router and/or the node may verify that the added tag is configured correctly. If the tag is not configured correctly, the packet may be dropped. The packet may receive a VID field 136 that reads 0x423. The node 122 first reads the number in the nibble 142. Before sending the packet 130 via port number 3, the port number is then removed and the VID information is shifted one step to the right so that the VID field 136 reads 0x042. The node 116 that is linked to port 3 of the node 122 receives the packet 130. The node 116 first reads the number in the nibble 142. Before sending the packet 130 via port number 2, the port number in the nibble 142 is removed and the VID information is again shifted one step to the right so that the VID field 136 now reads 0x004. The node 106 that is linked to port 2 of the node 116 receives the packet 130. The node 106 first reads the number in the nibble 142. Before sending the packet 130 via port number 4 to the customer 102, the entire tag including VID field is removed, since only the last nibble is non-zero.

While the present invention has been described in accordance with preferred compositions and embodiments, it is to be understood that certain substitutions and alterations may be made thereto without departing from the spirit and scope of the following claims.

The invention claimed is:

1. A method of sending information through a node, comprising:
   providing a node having a first access port, a second access port, a first uplink and a second uplink;
   sending a first packet via the first access port to the node;
   when the node is in a leaf mode, the node adding a tag inside the first packet, the tag containing a first port number corresponding to the first access port;
   when the node is in a branch mode, the node adding the first port number to the tag;
   sending a second packet, tagged with information containing a second port number corresponding to the second access port, via the first uplink to the node;
   the node receiving the second packet;
   the node removing a second port number corresponding to the second access port from the tag; and
   the node sending the second packet via the second access port.

2. The method according to claim 1 wherein the method further comprises providing the tag of the first packet with a first nibble containing a port number of a previous node and a second nibble, the node shifting the port number of the previous node to the second nibble and adding the first port number to the first nibble.

3. The method according to claim 2 wherein the method further comprises the node adding the first port number to the first nibble.

4. The method according to claim 1 wherein the method further comprises providing the tag of the second packet with a first nibble containing the second port number and a second nibble.

5. The method according to claim 4 wherein the method further comprises the node removing the second port number from the first nibble.

6. The method according to claim 5 wherein the method further comprises the node moving a port number in the second nibble to the first nibble.

7. The method according to claim 1 wherein the method further comprises permitting the node to only forward an incoming packet received via the first or the second access pore to the first uplink and the second uplink.

8. The method according to claim 1 wherein the method further comprises permitting the node to only forward an incoming packet received via the first or the second uplink to the first access port or second access port.

9. The method according to claim 1 wherein the method further comprises the node removing the tag from the second packet when the tag contains no non-zero values in first and the second nibbles.

10. The method according to claim 1 wherein the method further comprises the node forwarding the first packet in the first uplink and in the second uplink.

11. A method of sending information through a node, comprising:
providing a first node having a first access port, a second access port, a first uplink and a second uplink;
sending a first packet, tagged with information containing a first port number corresponding to the first access port, via the first access port to the first node;
the first node receiving the first packet and sending the first packet via the first uplink and the second uplink to network edge equipment;
sending a second packet, tagged with information containing a second port number corresponding to the second access port, via the second access port to the first node;
the first node receiving the second packet and sending the second packet via the first uplink and the second uplink to the network edge equipment.

12. The method according to claim 11 wherein the method further comprises connecting the first uplink to a first router and connecting the second uplink to a second router.

13. The method according to claim 12 wherein the method further comprises sending the first packet in the first uplink to the first router and in the second uplink to the second router.

14. The method according to claim 11 wherein the method further comprises connecting the first uplink to a first router and connecting the second uplink to a second node.

15. The method according to claim 14 wherein the method further comprises sending the first packet via the first uplink to the first router and sending the first packet via the second uplink to the second node.

16. The method according to claim 15 wherein the method further comprises the second node receiving the first packet from the first node and sending the first packet via a first uplink of the second node to a router connected to the first uplink of the second node.

17. The method according to claim 11 wherein the method further comprises preventing the first node from forwarding the first packet, received via the first access port, to the second access port of the first node.

18. The method according to claim 14 wherein the method further comprises connecting the second uplink of the first node to a second uplink of the second node.

19. The method according to claim 11 wherein the method further comprises the first node forwarding all valid packets received in the first access port to the first uplink and the second uplink and forwarding all valid packets received in the second access port to the first uplink and the second uplink.

* * * * *